United States Patent

Büchler et al.

Patent Number: 6,084,835
Date of Patent: Jul. 4, 2000

[54] DEVICE FOR SCANNING OPTICAL DISCS USING PHASE DETECTION IN A SYSTEM WITH SIGNIFICANT OBJECTIVE LENS MOVEMENT

[75] Inventors: Christian Büchler; Lieu Kim Dang, both of Villingen-Schwenningen, Germany

[73] Assignee: Deutsche Thomson-Brandt GmbH, Villingen-Schwenningen, Germany

[21] Appl. No.: 08/902,179

[22] Filed: Jul. 30, 1997

[30] Foreign Application Priority Data

Jul. 31, 1996 [DE] Germany .......................... 196 30 887

[51] Int. Cl.[7] ................................................ G11B 7/095
[52] U.S. Cl. ................................... 369/44.32; 369/44.35; 369/44.36
[58] Field of Search .............................. 369/44.35, 44.36, 369/44.29, 44.32, 44.41, 54

[56] References Cited

U.S. PATENT DOCUMENTS

| | | | |
|---|---|---|---|
| 5,003,524 | 3/1991 | Ikeda | 369/44.32 |
| 5,029,151 | 7/1991 | Shikichi | 369/44.35 |
| 5,109,366 | 4/1992 | Moriya et al. | |
| 5,142,518 | 8/1992 | Hangai et al. | 369/44.29 |
| 5,148,420 | 9/1992 | Yamamurd | |
| 5,189,653 | 2/1993 | Yanagi | 369/44.32 |
| 5,245,597 | 9/1993 | Lee et al. | |
| 5,258,968 | 11/1993 | Matsuda et al. | |
| 5,287,339 | 2/1994 | Watanabe | 369/44.32 |
| 5,517,475 | 5/1996 | Koyama et al. | 369/44.35 |
| 5,764,605 | 6/1998 | Zucker et al. | 369/44.35 |
| 5,768,227 | 6/1998 | Baba | 369/44.29 |

FOREIGN PATENT DOCUMENTS

3214951 C2 of 0000 Germany .

*Primary Examiner*—Thang V. Tran
*Attorney, Agent, or Firm*—Joseph S. Tripoli; Peter M. Emanuel; Paul P. Kiel

[57] ABSTRACT

Tracking error signal in an optical read/write device, such as a CD ROM, are fine tuned for deviations in the positions of the lens structure normal to the recorded medium to provide more precise tracking control. Track error signal is developed by means of DPD-TE circuitry, using for example, signals from a four quadrant photodetector. Selected pairs of the signals from the photodetector are summed and the sums are differenced to develop an intermediate signal. The intermediate signal is amplified with a gain proportional the reciprocal of the intensity of light received by the photodetector, and thereafter combined with the track error signal to provide a corrected track error signal.

13 Claims, 3 Drawing Sheets

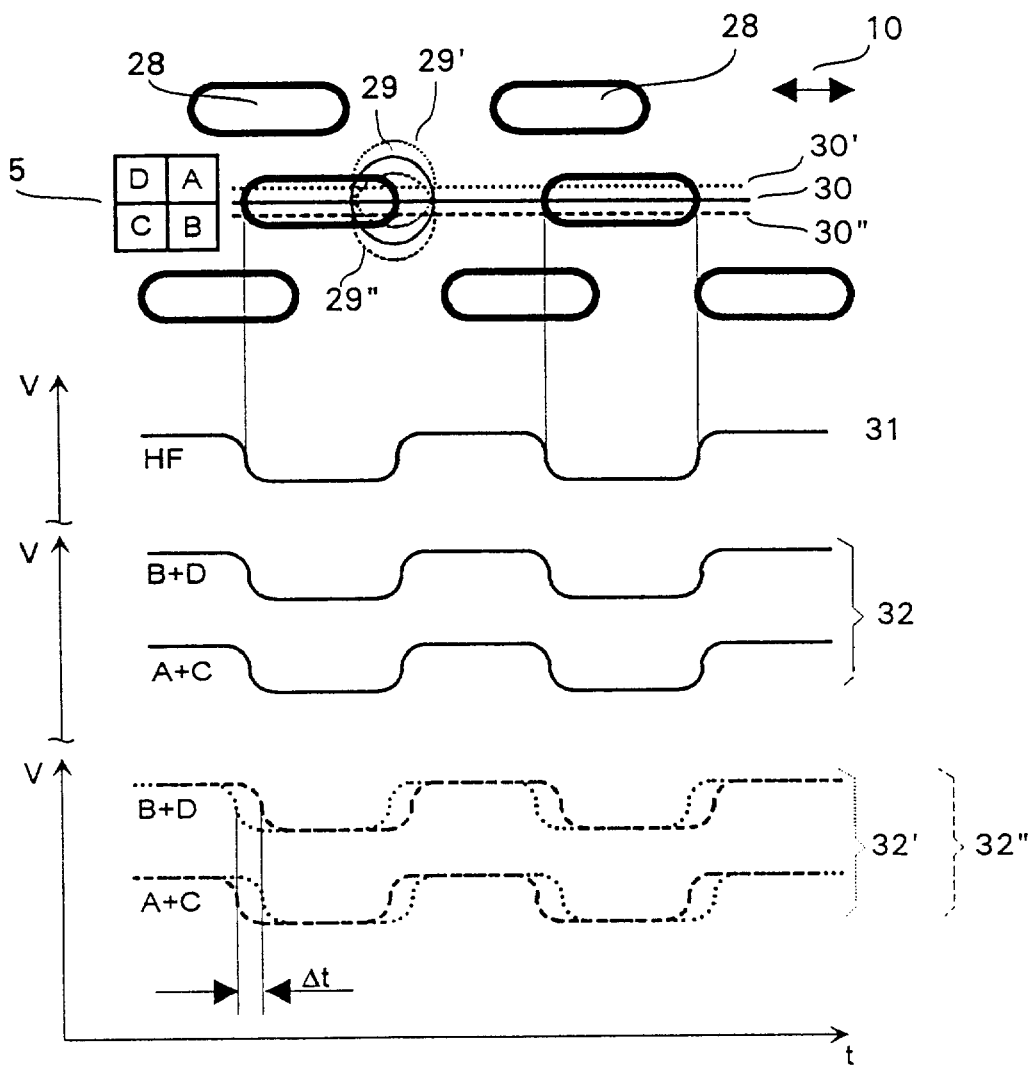
Fig. 3
Fig. 2
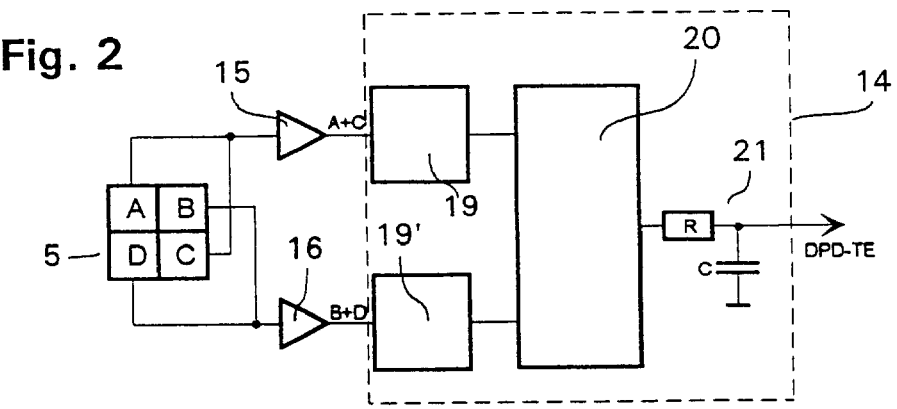

DEVICE FOR SCANNING OPTICAL DISCS USING PHASE DETECTION IN A SYSTEM WITH SIGNIFICANT OBJECTIVE LENS MOVEMENT

BACKGROUND OF THE INVENTION

The present invention is concerned with a device for reading from and/or writing to optical recording media.

A device of this type is disclosed in U.S. Pat. No. 4,497,048. The optical recording medium which is read by this device has an information layer into which depressions in the form of concentric circles or spirally arranged tracks are recorded. This information layer is reflective, and the depressions, the so-called pits, are scanned by means of a light beam. The light reflected from the optical recording medium is directed onto a photodetector arrangement, where a diffraction pattern is formed which depends on the structure of the region of the information layer just scanned. The photodetector is divided into areas which are arranged laterally with regard to the track direction and whose signals are used for determining a tracking signal. In this case, the relative phase angle of these signals is compared. The time difference between the signals, that is to say the relative phase shift with respect to one another, is proportional to the deviation of the light beam from the track centre. This time difference is therefore used as a track error signal for regulating the tracking. This method of tracking, which is called "Differential Phase Detection" (DPD), has the advantage that it operates largely independently of the light intensity reflected by the optical recording medium. The reflected light intensity may differ depending on the reflectivity of the optical recording medium, and may vary due to different properties of the optical components caused by ageing or caused by environmental influences.

In general, a coarse drive and a vernier drive are present in devices of the generic type for the purpose of tracking. The coarse drive causes the entire read-out head, also called "pick-up", which generally comprises the light source, the optical system and the detector arrangement, to be displaced in the radial direction with regard to the optical recording medium. The vernier drive effects tracking of the light beam by a small number of track spacings by displacing the objective lens. A disadvantage of the known device resides in the fact that the vernier drive displaces only the objective lens, as a result of which the light beam is displaced from the optical axis. This leads to a slight lateral displacement of the diffraction pattern on the photodetector arrangement. This effects a shift in the phase angle of the evaluated signals and is consequently interpreted as a track deviation. This is to say although the light beam lies optimally on the track, the error brought about by the lens displacement causes the tracking to be regulated in such a way that a slight deviation of the beam from the centre of the track is always effected. This deviation is greater the further the objective lens is displaced from the optical axis. This disadvantage becomes apparent more disturbingly the smaller the structures of the information layer of the optical recording medium are. The range which can be reliably readjusted by means of the vernier drive is in this case restricted to a greater and greater extent. The generation of a tracking signal is therefore restricted to a greater and greater extent as a result of an increasing deviation of the objective lens from the optical axis.

BRIEF SUMMARY OF THE INVENTION

The object of the present invention, therefore, is to develop further a device operating according to the above-mentioned tracking method in such a way that a tracking signal can be readjusted without any problems by means of a vernier drive in a larger range of the objective lens displacement than is possible according to the prior art.

According to the invention, an identification means for identifying a displacement of the objective lens from the optical axis is provided, which identification means emits a correction signal to the tracking means. This has the advantage that the track error signal is corrected in direct dependence on the cause of the error, that is to say on the displacement of the objective lens from the optical axis. The above-mentioned tracking method can thus also be used for optical recording media having a high recording density, that is to say a small pit structure, without restricting the range which can be regulated by means of the vernier drive. Direct evaluation of the drive signal of the objective lens is not practical since this signal does not necessarily correspond to the actual deflection. For example, an external influence such as a vibration, the earth's gravitational pull when the device is slanted or the like can lead to the objective lens being deflected in the absence of a corresponding drive signal. This disadvantage is likewise eliminated by the solution according to the invention. The device according to the invention may be a device which is suitable exclusively for reading from or exclusively for writing to optical recording media. However, a device which is suitable both for reading from and for writing to optical recording media lies within the scope of the present invention. Instead of an objective lens, it is likewise advantageously possible to use a different optical element which fulfils a corresponding function, for example a holographic optical element.

According to the invention, it is provided that the identification means comprises a stationary part and a part which is coupled to the lens. This has the advantage that it is possible directly to determine the movement of the objective lens and the magnitude thereof. The identification means provided here is, for example, a Hall sensor or a capacitive sensor, which in each case have a stationary part and a part which is coupled to the lens. A mirror which is fastened to the lens and has an assigned light source/receiving unit, which determines the movement of a reflected beam, or any other suitable two- or multi-part sensor can also advantageously be employed here.

According to another embodiment of the present invention, it is provided that the identification means is a correction signal generation means which evaluates the signals emitted by the detector elements. This has the advantage that no additional components to be fitted in the region of the optical system are required. No additional structural space is therefore required in the region of the optical system, and negative influences on the lens by an additional part, however lightweight, of the identification means which is coupled to the said optical system are precluded. Furthermore, it may be regarded as advantageous that those signals of the detector elements which are present in any case are utilized.

According to the invention, the correction signal generation means has a difference formation means for forming the difference signal between the signal emitted by a first and a second detector area, the difference signal being amplified and output as correction signal. This has the advantage of requiring only a small number of additional functional units in comparison with the known device. Despite the simplicity of its realization, reliable correction signal formation is nevertheless ensured since the difference signal is greater the further the spot, that is to say the light beam, deviates from the optical axis. The amplifier operates with a specific gain factor which is adapted such that the value of the correction signal is suitably related to the value of the tracking error signal.

According to the invention, provision is furthermore made for configuring the gain factor by which the difference signal is amplified for the purpose of forming the correction signal to be variable.

This has the advantage that matching to the reflectivity of the optical recording medium or other conditions which influence the light intensity falling onto the detector is possible. Even more exact tracking is consequently achieved. The amplifier in this case has, for example, an input via which the variable gain is controlled. A disk type identification means which is present in the device may be connected to this input, which means serves to identify the type of optical recording medium and can emit a signal corresponding to the reflectivity of the very optical recording medium to be read out or written to by the device. The gain factor can be set correspondingly. The gain factor can alternatively be determined by another suitable method.

It is particularly suitable to determine the reflectivity of the optical recording medium directly and to feed the reciprocal of the said reflectivity to the amplifier as the variable component of the gain factor. This has the advantage that the greatest interfering influence on the correction signal, namely the dependence on the reflectivity of the optical recording medium, is eliminated in this way. The correction signal is thus normalized to the reflectivity of the optical recording medium by multiplication by the reciprocal of the reflectivity. In the simplest case, the information signal or HF signal is used for this purpose, which signal is the summation signal of the detector elements. The reciprocal is formed from this signal and is then fed to the amplifier as the factor. The combination of reciprocal former and amplifier thus acts as a normalization amplifier. Since both the HF signal and the correction signal are determined directly from the signals of the photodetectors, fluctuations caused by the pit structure of the optical recording medium are directly compensated for. If, due to the components, no optimum correlation, for example identical phase angle and identical frequency response, of these signals can be achieved, it is provided firstly to form the time average of the signals and then to carry out the amplification using a variable gain factor. This eliminates momentary fluctuations. In another variant of the invention, instead of the HF signal, it is also possible to use the signal of just one of the detector areas or a part thereof, which signal is then time-averaged. It likewise lies within the scope of the invention that the gain factor is composed of a combination of a plurality of components, for example a weighted sum from normalization and a further variable component.

According to a first variant of the invention, the first and the second detector area each comprise a single detector element. This has the advantage that a total of just two photodetectors are necessary, which leads to a miniaturization of the detector arrangement and low production costs.

According to another variant of the invention, provision is made for constructing the first and second detector areas from two detector elements in each case, the summation signals, formed crosswise, of the four detector elements being fed to the phase comparison means. This has the advantage of better resolution. In the event of a deviation from the track, the diffraction patterns generally have a diagonal distribution with regard to the detector arrangement which is divided into four, with the result that evaluation of the summation signals which are formed crosswise, that is to say in the diagonal direction, enables a more accurate tracking signal.

According to the invention, provision is made for determining the gain factor automatically and independently of the cause of the interfering influences. This has the advantage that all possible interfering influences are compensated for without their interaction and occurrence having to be known in detail beforehand.

An advantageous method in this respect is specified in the method claim.

The features cited in the individual claims can also expediently be applied in combination with one another. Further advantages of the device according to the invention and of the method according to the invention can be gathered from the following description.

BRIEF DESCRIPTION OF THE SEVERAL VIEWS OF THE DRAWINGS

In the Figures:

FIG. 2 shows the phase detector of a device according to the invention, FIG. 3 shows the phase relationship between the detector signals of a device according to the invention.

DETAILED DESCRIPTION

Figure 1:
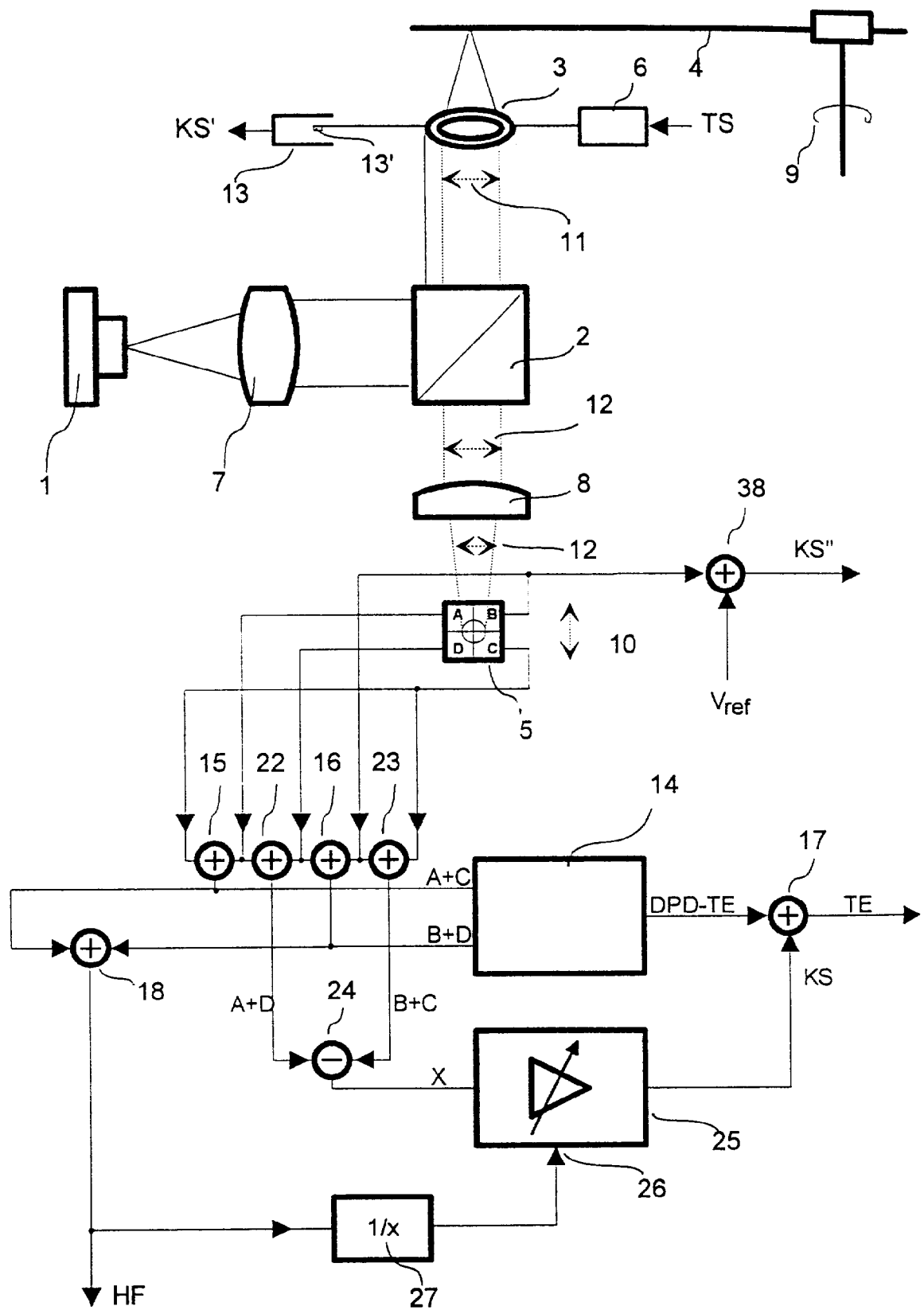
FIG. 1 shows a diagrammatic illustration of a device according to the invention.

FIG. 1 shows a diagrammatic illustration of a device according to the invention. A light source 1 generates a light beam which is focused onto an optical recording medium 4 via a semi-transparent mirror 2, which is illustrated as part of a polarizing beam splitter in the exemplary embodiment, and an objective lens 3. The light beam is reflected from the optical recording medium and directed onto a detector arrangement 5. The detector arrangement 5 is represented in a manner tilted through 90°, that is to say in a plan view, and comprises four detector elements A, B, C and D. Arrow 10 shows the track direction, that is to say the direction in which the recording medium 4 moves relative to the detector arrangement 5. The detector arrangement 5 can consequently be divided into two detector areas which are situated laterally with respect to the track direction and comprise the detector elements A and D, on the one hand, and B and C, on the other hand.

A collimator 7 is arranged between the light source 1 and the mirror 2, and a convex lens 8 is arranged between the mirror 2 and the detector arrangement 5. A vernier drive 6 moves the objective lens 3 in the radial direction with regard to the optical recording medium 4 in accordance with a vernier drive actuating signal TS. The recording medium 4 is designed as a disk in the exemplary embodiment, for example corresponding to an audio compact disc (CD), a videodisk, a recording medium having a high recording density (DVD) or the like. The optical recording medium 4 is made to rotate by means of a disk drive 9 which is indicated only diagrammatically here. A section through the recording medium 4 along a diameter is illustrated. The light beam focused by the objective lens 3 onto the recording medium 4 is located in the radially outer region of the recording medium 4. The displacement direction of the beam, which is reflected from the optical recording medium 4, after passing through the objective lens 3, which is brought about by the displacement of the objective lens 3 effected by the vernier drive 6, is indicated by the arrows 12. Arrow 11 represents the movement direction of the lens 3.

According to a first embodiment of the invention, a part 13' of a lens movement identification means, which interacts with a stationary part 13, is coupled to the objective lens 3. The stationary part 13 of the identification means emits a correction signal KS'. The parts 13 and 13', which are represented only diagrammatically, are not described in greater detail since what is involved here may be any desired suitable position or motion sensor familiar to a person skilled in the art.

The outputs of the detector elements A and C are connected to a summer 15, and the outputs of the detector elements B and D are connected to a summer 16. The corresponding summation signals A+C and B+D are forwarded to a phase detector 14, at whose output there is present a track error signal DPD-TE determined by the DPD method. The output of the phase detector 14 is connected to a further summer 17, at whose other input a correction signal KS, KS' or KS" is present and whose output signal is the corrected track error signal TE. The correction signal KS' in this case corresponds to the correction signal determined according to the first embodiment already described, while the correction signal KS and KS" is determined by means of second and third embodiments, respectively, of the exemplary embodiment which are described below.

The outputs of the summers 15 and 16 are connected to the inputs of a further summer 18. Consequently, the sum of the signals of all the detector elements A, B, C and D is present at the output of the summer 18. This signal is the information signal HF which is forwarded to an evaluation unit (not illustrated here) in order to be converted into signals which can be evaluated for the user.

The structure and the functioning of the phase detector 14 are described below with reference to FIGS. 2 and 3.

According to a second exemplary embodiment, provision is made for determining the displacement of the objective lens 3 from the signals of the detector arrangement 5. For this purpose, the detector elements A and D are connected to the input of a summer 22, and the outputs of the detector elements B and C are connected to the input of a summer 23. The summation signals A+D and B+C are present at the outputs of the summers 22 and 23, respectively, and correspond to the detector areas situated laterally with respect to the track direction and comprising detector elements A and D and detector elements B and C. The outputs of the summers 22 and 23 are connected to a difference former 24, at whose output a difference signal X is present. The output of the difference former 24 is connected to an amplifier 25 whose gain factor K is variable. The correction signal KS is present at the output of the amplifier 25. A control input 26 of the amplifier 25 serves to vary the gain factor K in a controlled manner. In the present exemplary embodiment, the control input 26 is connected to the output of a reciprocal former 27, at whose input the information signal HF is present. The reciprocal former 27 may simultaneously have an amplifying or filtering function as well. The gain factor K of the amplifier 25 therefore corresponds to K=1/HF, the reciprocal of the information signal HF, if the reciprocal former 27 has a gain factor of 1, that is to say does not have an amplifying action.

In an alternative configuration of the invention, the detector arrangement 5 comprises just two detector elements A and B. The summers 15, 16, 22 and 23 are not necessary in this case, and the output signals of the detector elements A and B are fed directly to the inputs of the phase detector 14 and of the difference former 24. The structure of this alternative configuration is thus simpler, but, compared with the use of four detector elements, does not completely achieve the accuracy thereof.

According to a third embodiment of the invention, one of the detector elements, detector element B in FIG. 1, is connected to a summer 38, at whose other input a reference signal $V_{ref}$ is present and at whose output a correction signal KS" is present. The reference signal is set such that the correction signal KS" becomes zero when the detector element B is illuminated by the spot which is centred on the detector arrangement 5 with regard to the track direction indicated by arrow 10. This setting can be done during production, for example. Any deviation of the spot from the centred position then results in a positive or negative correction signal KS".

In order to describe the functioning of the device according to the invention, reference will first be made to FIG. 2. The structure of the phase detector 14 is diagrammatically elucidated in FIG. 2. The inputs of the phase detector 14 are connected to a respective converter 19 and 19', the outputs of which are connected to the inputs of a phase comparator 20. The output of the phase comparator 20 is connected via a low-pass filter 21, in this case diagrammatically illustrated by means of the resistor R and capacitor C, to the output of the phase detector 14, at which the track error signal DPD-TE determined by means of the DPD method is present. The first input of the phase detector 14 is connected to the output of the summer 15, at whose inputs the output signals of the detector elements A and C are present. The second input of the phase detector 14 is connected to the output of the summer 16, whose inputs are connected to the detector elements B and D.

The signals of the detector elements A and C are added in the summer 15, and the summation signal is brought to the logic level in the converter 19, which acts as a zero crossing comparator. A corresponding digitized summation signal B+D is formed by means of the summer 16 and the converter 19'. These two signals are fed to the phase comparator 20, which evaluates the time interval between the two signals. The track error signal DPD-TE is the average of these time differences and is formed by the low-pass filter 21. If the scanning point or spot 29, as explained below with reference to FIG. 3, follows the track centre 30 exactly, then the zero crossings of the summation signals A+C and B+D take place simultaneously and the resultant track error is zero. If the spot 29 follows the track with a constant deviation from the track centre, then the zero crossing of these summation signals no longer occurs simultaneously, but rather shifted in time with respect to one another. On average, the time difference occurring is approximately proportional to the deviation of the scanning from the track centre, it being possible for the time difference referring to one of the signals to be positive or negative. The sign of the time difference therefore comprises the direction and the magnitude, on the other hand, comprises the size of the deviation.

In its upper part, FIG. 3 shows a diagrammatic, greatly enlarged detail of the information layer of the optical recording medium 4 in plan view. Three tracks lying next to one another are evident, two or three of the depressions, the so-called pits 28, which form the said tracks and have an elongate extension in the track direction being illustrated. Both the spacings of the pits 28 in the track direction and the length thereof in the track direction (arrow 10) can deviate, within certain limits, from the conditions represented here. This depends on the modulation method used to convert the information to be stored into the pit pattern and on the content of the recorded information items. In particular, the pits 28 may have a different length.

A detector arrangement 5 which is situated symmetrically with respect to the track centre 30 of the central track and has the detector elements A, B, C and D is indicated to the left of the pits 28. This serves to illustrate how the output signals of the detector areas A, B, C and D behave upon displacement of the light spot 29, which falls onto the information layer, from the track centre 30.

In the lower region of FIG. 3, the amplitudes of several combinations of the output signals of the detector areas A, B, C and D are plotted against the time axis t, the time axis t corresponding to the space axis in the track direction in the event of a movement of the spot 29 and of the optical recording medium in the track direction (arrow 10) relative to one another at normal read-out speed.

The curve 31 depicted directly underneath the pits 28 shows the information signal HF, that is to say the sum of the signals of all the detector elements A, B, C and D. As long as the spot 29 does not encounter one of the pits 28, the amplitude of the information signal HF is large. As soon as the spot 29 moves onto one of the pits 28, the amplitude decreases owing to destructive interference and reaches a minimum as soon as the largest possible overlap of spot 29 and pit 28 is reached.

The curves 32 show a combination of the signals A+C and B+D with no track errors, that is to say when the spot 29 is centred with respect to the track centre 30, or when there is no deflection of the objective lens 3. The curves 32' (dotted) and the curves 32" (dashed) show the time shift of the summation signals A+C and B+D in dependence on the lens displacement or the deviation of the spot 29' and of the spot 29" from the track centre 30 in the direction of the displaced scanning track 30' and 30", respectively. Since both a deviation from the track centre and a lens displacement lead to the same result, the two dependencies cannot be separated. The time shift Δt of the signals A+C and B+D relative to one another corresponds, in terms of its magnitude, to the size of the deviation of the displaced scanning track 30', 30" from the track centre 30 and, in terms of its sign, to the direction of the corresponding deviation. From this—as described above—the phase detector 14 determines the track error signal DPD-TE.

It may be noted that, depending on the optical structure, the signals of the detector areas A, B, C and D may have temporarily static shifts relative to one another even in the absence of a track deviation or lens deflection. The shifts of B+D in comparison with A+C which are shown in the curves 32' and 32" are, however, typical for a lens deflection or deviation from the track centre.

Figure 4:
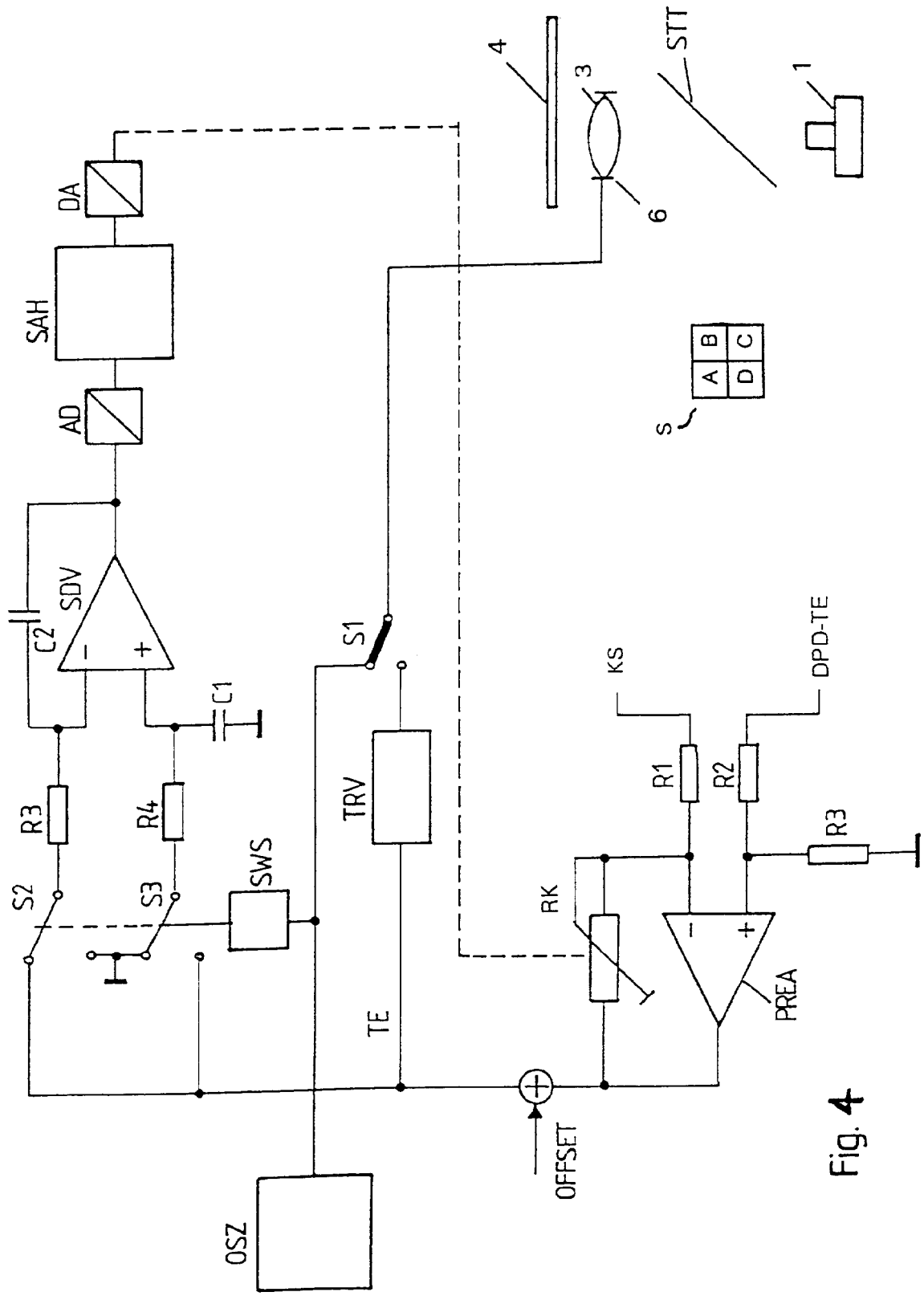
FIG. 4 shows an arrangement for adjusting the gain factor of a device according to the invention.

FIG. 4 shows an arrangement for adjusting the gain factor K of a device according to the invention. The track error signal DPD-TE detected in the event of a deflection from the track centre is fed, for the purpose of setting the gain factor K in accordance with FIG. 4, to a K factor controller RK, which is preferably formed by an amplifier PREA which preferably has a resistor having an electrically variable resistance in at least one feedback path for setting the gain factor K. A compensated track error signal TE is then available at the output of the K factor controller RK or of the amplifier PREA before or after an offset correction OFFSET, which track error signal TE, with an open track regulating circuit, forms the starting point of the methods for automated setting of the gain factor K.

The basic circuit diagram, represented in FIG. 4, for carrying out a predominantly integrative method for automatic K factor setting shows an optical recording medium 4 which is scanned by the scanning beam of a light source 1, the light of the light source 1 passing through a beam splitter STT and an objective lens 3 for focusing of the scanning beam on the optical recording medium 4 and for detection with a detector arrangement 5 which contains four detector elements A, B, C, D. The track error signal DPD-TE and the compensation signal KS are connected in each case via a resistor R1, R2 to an input of an amplifier PREA. The non-inverting input of the amplifier PREA is earthed via a third resistor R3 and the inverting input is connected to the output of the amplifier PREA via a resistor which can be adjusted preferably by means of an electrical signal. The amplifier PREA connected up in this way forms the actual K factor controller RK, and an adder OFFSET is provided at its output for the purpose of known correction of an offset in the regulating circuit, with the result that, after the adder OFFSET, a compensated track error signal TE is available which can be set optimally with regard to the gain factor K in order to be able to be used as regulated variable for a connected track regulating amplifier TRV. In order to set the gain factor K, the track regulating circuit amplifier TRV is disconnected from the vernier drive 6, which is provided for the purpose of deflecting the objective lens 3, by means of a switch S1 and the vernier drive 6 is connected to an oscillator OSZ. The changeover signal is in this case provided by a microprocessor which is present in the device and is not illustrated. The oscillator OSZ preferably provides a sinusoidal control signal for the purpose of deflecting the actuator or the objective lens 3. The control signal deflects the vernier drive 6 and the objective lens 3 by a certain distance and, in accordance with FIG. 4, a threshold value switch SWS is connected to the oscillator OSZ and is used to form a square-wave signal SWS for driving two changeover switches S2, S3. By means of the changeover switches S2, S3, the compensated track error signal TE or earth potential is alternately applied to the inputs of a differential amplifier via a resistor R3 and a resistor R4, respectively, and the non-inverting input of the differential amplifier is connected via a first capacitor C1 to an earth connection, while its non-inverting input is connected via a second capacitor C2 to the output of the differential amplifier. The changeover switches S2, S3 form, together with the connected-up differential amplifier, a so-called synchronous detector SDV, which forms a synchronous detector output signal of a track error signal TE corresponding to the initial position of the K factor controller RK. Since the direction in which the K factor controller RK must be controlled for optimum setting is determined at the input of the synchronous detector SDV in connection with the changeover by the signal of the oscillator OSZ, which signal effects deflection by the above-mentioned distance, deviations of the compensated track error signal TE from an optimum profile can be used directly as setting criterion. The synchronous detector SDV is preferably a differential synchronous integrator or a synchronous demodulator which, owing to knowledge of the deflection direction of the objective lens 3, is advantageously used directly to determine the direction, that is to say increasing or decreasing, in which the gain factor K must be influenced for optimum setting. Iteration is not necessary. Since the frequency at which the objective lens 3 is deflected is known on the basis of the driving by the oscillator OSZ, the direction in which the K factor controller RK must be controlled is determined directly, since it can be assumed that the gain factor K or the gain of the amplifier PREA is too large when the oscillator signal and the synchronous demodulator signal are in phase and, on the other hand, the gain factor K or the gain of the amplifier PREA is too small when the oscillator signal and synchronous demodulator signal are in phase opposition. The oscillator frequency is preferably a frequency below the mechanical natural resonant frequency of the vernier drive 6.

A synchronous detector input signal corresponding to the deviation is active at the input of the synchronous detector SDV and, for the purpose of automated setting of the gain factor K, a sample-and-hold circuit SAH for driving the K factor controller RK is connected to the output of the synchronous detector SDV, preferably via an analog-to-digital converter AD. With the sample-and-hold circuit SAH, in a known manner, the respective current values for setting the K factor controller RK are accepted and, finally, the optimum set value is retained. This control as well as the changeover to the regulating mode are preferably carried out by the microprocessor already mentioned. In order to ensure a high long-term stability of the set value, determined in an automated way, for optimum K factor adjustments, a digital sample-and-hold circuit SAH is provided, although it is also possible, in principle, to use a sample-and-hold circuit SAH with analog operation. Furthermore, the exemplary embodiment has been described using a synchronous detector SDV providing essentially integral signal components, although the use of a synchronous detector SDV providing proportional signal components, too, is to be preferred particularly in connection with the adjustment behaviour in the event of slight deviations from the optimum setting. The advantages of using a signal containing both integral and proportional components are that the risk of a connected integrator operating right up to the limit is reduced and operation is effected with a defined residual error. Furthermore, the operating state in which no input signal is available is advantageously influenced by the proportional component.

As described in the exemplary embodiment, the gain factor K influences a gradient of the track error signal TE which occurs in dependence on the deflection of the objective lens 3. The gradient of the track error signal TE is caused by the fact that the track error signal TE is composed of two components, a first component being determined by the position of the objective lens 3 with respect to the track centre 30. This component corresponds to the actual track error signal. The other component is the component relating to the gradient of the track error signal. This component, which constitutes a component to be corrected with the gain factor K, results from the deflection of the objective lens 3 from its neutral position. The error component produced is corrected by means of the invention in the manner described above. The error component to be corrected by means of the gain factor K cannot be influenced either by means of an offset setting or by means of a gain setting in the regulating circuit. In order to set the gain factor K, the regulating circuit is opened and the objective lens 3 is deflected, whereas, by contrast, it is possible to set the offset or the gain in the regulating circuit with the regulating circuit closed, special driving of the vernier drive 6 for the purpose of deflecting the objective lens 3 from its neutral position being unnecessary, since this is done by the regulating signal.

We claim:

1. A device for reading from or writing to optical recording media by means of a light beam, comprising:

an objective lens for focusing the light beam on the recording medium;

detector elements arranged laterally with regard to the direction of a track of the optical recording medium, for converting light reflected from the recording medium into electrical signals;

a phase comparator responsive to phases of electrical signals emitted by the detector elements to provide a tracking signal proportional to phase differences exhibited by said electrical signals an identification circuit which evaluates the signals emitted by the detector elements, for developing a signal related to axial alignment of the objective lens;

signal combining circuitry, responsive to said signal related to axial alignment, and said tracking signal to produce a corrected tracking signal; and a driver, responsive to said corrected tracking signal, for causing said objective lens to follow a track on the recording medium.

2. Device according to claim 1, characterized in that the identification circuit includes:

a difference circuit generating a signal proportional to a difference of signals of a first and of a second detector area; and an amplifier, which emits the correction signal, having an input connected to receive said signal proportional to a difference.

3. A device as set forth in claim 2, wherein said amplifier has a variable gain factor.

4. A device as set forth in claim 3, further including:

circuitry generating a signal proportional to the reciprocal of light intensity detected by said detector elements; and means for applying the signal, proportional to the reciprocal of light intensity, as a gain controlling signal to said amplifier.

5. Device according to claim 2, characterized in that the first and the second detector areas are formed from a single detector element in each case.

6. Device according to claim 2, characterized in that the first and the second detector areas are each formed from a first and a second detector element and in that the summation signal from the first detector element of the first detector area and the second detector element of the second detector area as well as the summation signal from the second detector element of the first detector area and the first detector element of the second detector area are fed to the phase comparison means.

7. A device as set forth in claim 3, further including:

a vernier drive connected to a control device for deflecting the objective lens from its neutral position, and an evaluation unit for evaluating said tracking signal during the deflection of the objective lens; and an actuating device, responsive to said evaluating unit, for automated setting of a K factor controller to an optimal gain factor.

8. A device as set forth in claim 1 wherein said signal combining circuitry includes a signal combiner for combining said tracking signal with a combination of said signal related to axial alignment and a reference value.

9. Device for reading from or writing to optical recording media by means of a light beam, comprising:

an objective lens for focusing the light beam on the recording medium;

detector elements arranged laterally with regard to the direction of a track of the optical recording medium for converting light reflected from the recording medium into electrical signals;

a phase comparator responsive to phases of electrical signals emitted by the detector elements to provide a tracking signal proportional to the relative phases exhibited by said electrical signals;

an identification means which evaluates the signals emitted by the detector elements, for developing an output signal related to axial alignment of the objective lens;

an amplifier having an input coupled to receive said output signal related to axial alignment and a gain factor which is variable as a function of the intensity of light incident said detector elements; and signal combining circuitry, responsive to signal produced from said amplifier and said tracking signal to produce a corrected tracking signal.

10. A device as set forth in claim 9 further including:

circuitry generating a signal proportional to the reciprocal of light detected by said detector elements; and means for applying the signal, proportional to the reciprocal of light, as a gain controlling signal to said amplifier.

11. A device as set forth in claim 9 further including:

a vernier drive connected to a control device for deflecting the objective lens from its neutral position;

an evaluation unit for evaluating said tracking signal during the deflection of the objective lens; and an actuating device, responsive to said evaluating unit, for automated setting of a gain factor controller of said amplifier.

12. Device for reading from or writing to optical recording media by means of a light beam, comprising:

an objective lens for focusing the light beam on the recording medium;

a four quadrant photodetector for converting light reflected from the recording medium into electrical signals;

a phase comparator responsive to phases of electrical signals emitted by the four quadrant photodetector to provide a tracking signal;

a displacement detector responsive to said electrical signals emitted by the four quadrant photodetector, to provide a displacement signal related to axial alignment of the objective lens;

an intensity detector responsive to said electrical signals emitted by the four quadrant photodetector, to provide an intensity signal related to the intensity of said light beam reflected by the recording medium;

an amplifier having an input coupled to receive said displacement signal and a gain which is variable as a function of the intensity signal; and signal combining circuitry, responsive to signal produced from said amplifier and said tracking signal to produce a corrected tracking signal.

13. A device as set forth in claim 12 wherein the gain of said amplifier is proportional to the reciprocal of light intensity.

* * * * *